United States Patent [19]
Takizawa et al.

[11] Patent Number: 5,568,568
[45] Date of Patent: Oct. 22, 1996

[54] PATTERN RECOGNITION APPARATUS

[75] Inventors: Yoshinori Takizawa, Tokyo; Naoka Yoshida, Kanagawa, both of Japan

[73] Assignee: Eastman Kodak Company, Rochester, N.Y.

[21] Appl. No.: 824,277

[22] Filed: Jan. 23, 1992

[30] Foreign Application Priority Data

Apr. 12, 1991 [JP] Japan .................................... 3-080243

[51] Int. Cl.⁶ ...................................................... G06K 9/62
[52] U.S. Cl. ........................................... 382/220; 382/160
[58] Field of Search .................................. 382/14, 15, 30

[56] References Cited

U.S. PATENT DOCUMENTS

| | | | |
|---|---|---|---|
| 3,539,994 | 11/1970 | Clapper | 382/14 |
| 3,588,823 | 6/1971 | Chow et al. | 382/15 |
| 3,609,686 | 9/1971 | Savory et al. | 382/14 |
| 3,626,368 | 12/1971 | Lee | 382/15 |
| 4,599,692 | 7/1986 | Tan et al. | 382/15 |
| 4,932,065 | 7/1990 | Feldgajer | 382/15 |
| 5,067,164 | 11/1991 | Denker et al. | 382/15 |

*Primary Examiner*—Leo Boudreau
*Assistant Examiner*—Chris Kelley
*Attorney, Agent, or Firm*—Marc A. Rossi; Rossi & Associates

[57] ABSTRACT

A pattern recognition system is disclosed that uses a predetermined minimal number of comparison pixels in a pattern recognition process for input image recognition. For each pixel within a prescribed frame, a probability of the existence of a reference pattern is calculated by a probability calculation means. These probability values are used by a entropy calculation means to calculate pixel entropy values. Pixels with a high entropy value are then extracted and designated as comparison pixels for the pattern recognition operation. Comparison means compares these comparison pixels with corresponding pixels of an image pattern, and determines which of the reference patterns has a highest probability of being the image pattern.

6 Claims, 8 Drawing Sheets

$(\times 10^{-2})$   200

FIG. 5

|    |    | 204 |     | 202 |     |     |     | 204 |     |     | 202 |     |     |     |    |    |
|----|----|-----|-----|-----|-----|-----|-----|-----|-----|-----|-----|-----|-----|-----|----|----|
| 00 | 00 | 00  | 00  | 00  | 00  | 00  | 00  | 00  | 00  | 00  | 00  | 00  | 00  | 00  | 00 | 00 |
| 00 | 00 | 05  | 13  | 25  | 34  | 47  | 53  | 61  | 58  | 61  | 54  | 44  | 31  | 13  | 00 | 00 |
| 00 | 13 | 51  | 81  | 92  | 100 | 99  | 94  | 87  | 72  | 71  | 91  | 99  | 89  | 61  | 23 | 00 |
| 13 | 38 | 78  | 98  | 96  | 90  | 87  | 77  | 56  | 23  | 13  | 47  | 78  | 100 | 89  | 58 | 10 |
| 13 | 53 | 95  | 96  | 90  | 90  | 81  | 59  | 10  | 00  | 05  | 38  | 67  | 89  | 98  | 73 | 13 |
| 13 | 40 | 96  | 96  | 92  | 88  | 77  | 70  | 69  | 61  | 64  | 65  | 71  | 90  | 100 | 81 | 31 |
| 10 | 41 | 93  | 100 | 99  | 99  | 99  | 100 | 100 | 100 | 99  | 98  | 90  | 96  | 100 | 86 | 43 |
| 13 | 54 | 92  | 98  | 99  | 99  | 99  | 96  | 96  | 92  | 92  | 97  | 98  | 99  | 100 | 84 | 43 |
| 13 | 58 | 88  | 98  | 99  | 98  | 100 | 96  | 93  | 87  | 92  | 99  | 99  | 100 | 100 | 83 | 36 |
| 13 | 59 | 86  | 99  | 100 | 99  | 100 | 100 | 97  | 97  | 99  | 100 | 99  | 100 | 97  | 80 | 31 |
| 10 | 53 | 84  | 99  | 99  | 100 | 100 | 100 | 100 | 99  | 95  | 91  | 93  | 100 | 94  | 77 | 29 |
| 10 | 49 | 85  | 99  | 99  | 100 | 99  | 100 | 99  | 97  | 80  | 72  | 72  | 98  | 92  | 75 | 34 |
| 10 | 53 | 86  | 98  | 99  | 100 | 100 | 99  | 96  | 88  | 68  | 63  | 63  | 90  | 98  | 77 | 23 |
| 13 | 60 | 90  | 100 | 100 | 99  | 100 | 100 | 99  | 96  | 81  | 70  | 73  | 90  | 100 | 86 | 29 |
| 10 | 70 | 94  | 100 | 100 | 100 | 99  | 96  | 96  | 100 | 99  | 92  | 85  | 90  | 98  | 94  | 42 | 00 |
| 13 | 65 | 98  | 98  | 100 | 100 | 99  | 95  | 94  | 95  | 97  | 100 | 92  | 89  | 95  | 97  | 51 | 00 |
| 13 | 70 | 97  | 99  | 100 | 98  | 95  | 93  | 92  | 89  | 93  | 99  | 95  | 89  | 93  | 99  | 49 | 00 |
| 17 | 76 | 98  | 100 | 100 | 97  | 90  | 79  | 83  | 89  | 93  | 99  | 97  | 93  | 96  | 100 | 49 | 00 |
| 20 | 70 | 98  | 100 | 100 | 95  | 82  | 73  | 80  | 89  | 96  | 100 | 96  | 93  | 99  | 98  | 38 | 00 |
| 13 | 65 | 97  | 99  | 99  | 96  | 79  | 84  | 87  | 95  | 100 | 97  | 87  | 96  | 100 | 90  | 34 | 00 |
| 13 | 64 | 98  | 100 | 100 | 98  | 100 | 100 | 99  | 99  | 89  | 78  | 80  | 97  | 99  | 72  | 29 | 00 |
| 17 | 58 | 96  | 99  | 96  | 82  | 75  | 76  | 84  | 79  | 64  | 64  | 82  | 99  | 91  | 56  | 10 | 00 |
| 13 | 43 | 87  | 100 | 96  | 75  | 75  | 75  | 83  | 86  | 68  | 78  | 95  | 98  | 75  | 31  | 13 | 00 |
| 10 | 23 | 63  | 86  | 100 | 92  | 77  | 82  | 91  | 94  | 91  | 97  | 97  | 79  | 49  | 17  | 05 | 00 |
| 00 | 13 | 17  | 45  | 73  | 87  | 96  | 95  | 93  | 92  | 87  | 81  | 61  | 41  | 13  | 10  | 00 | 00 |
| 00 | 05 | 10  | 10  | 13  | 13  | 26  | 23  | 13  | 13  | 10  | 10  | 13  | 00  | 05  | 00  | 00 | 00 |

FIG. 8C ance with the present invention, the
PATTERN RECOGNITION APPARATUS

FIELD OF THE INVENTION

The present invention relates to a pattern recognition apparatus that judges an input pattern on the basis of a comparison of the input pattern with a plurality of registered reference patterns.

BACKGROUND OF THE INVENTION

Pattern recognition apparatuses are known in the prior art for optically reading characters and patterns, and are utilized in information processing. In recent years, the need for more sophisticated information processing and the processing of more complex information has led to a demand in various fields for pattern recognition apparatuses that offer higher recognition rates.

Figure 9:
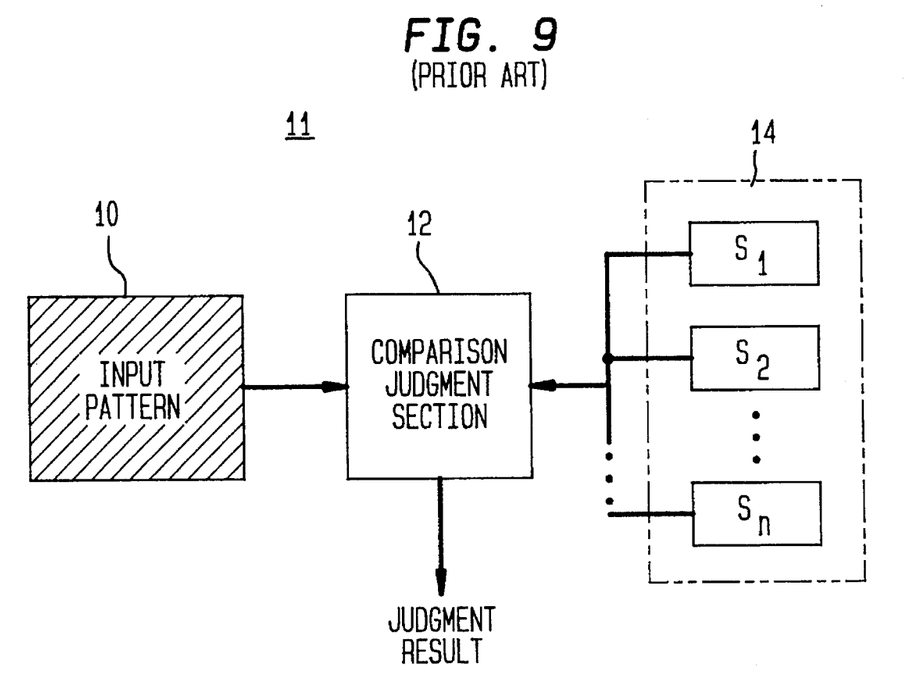
FIG. 9 shows a block diagram of a general principles of operation of a prior art pattern recognition system.

Referring now to FIG. 9, there is shown a block diagram illustrating a basic processing principle of a conventional (prior art) pattern recognition apparatus 11 comprising an input pattern 10, a comparison judgment section 12, and a registration section 14 (shown within a dashed line rectangle) which is adapted to store a plurality of reference patterns $S_1$ to $S_n$. In such prior art pattern recognition apparatus 11, the input pattern 10 is (a) scanned by a charge-coupled device (CCD) (not shown) or other such means, (b) subjected to prescribed preprocessing (not shown), and (c) then inputted to a comparison judgement section 12. Preprocessing refers to the removal of noise components, image rotation, and other such adjustments. Prior to being inputted to the comparison judgement section 12, the input pattern 10 is first binarized (not shown), and then is inserted into a prescribed frame (not shown) that defines the limits of the data of the input pattern 10. The registration section 14 stores the plurality of reference patterns $S_1$ to $S_n$ against which the input pattern 10 is compared in the comparison judgment section 12. Each of the boundaries of a frame corresponding to the above-described prescribed frame.

The comparison judgment section 12 judges which of the reference patterns $S_1$ to $S_n$ is most similar to the input pattern 10 and then generates an output representative of the outcome of such judgment. In making such judgment, all pixels in a frame form points of comparison for a process of comparing the input pattern with the reference patterns. The number of matching points for each of the comparisons is mathematically processed as, for example, by applying a correlation function or the like. The reference pattern having a highest correlation coefficient is taken to represent the input pattern 10. A perfect match between the input pattern 10 and a reference pattern (e.g., reference pattern $S_i$) will yield a correlation value of 1, while lesser degrees of similarity will produce correspondingly lower correlation values. The correlation values provide a basis for determining the reference pattern $S_i$ with the highest probability of being the input pattern 10.

A drawback in the prior art pattern recognition apparatus 11 is that when the plurality of reference patterns $S_1$ to $S_n$ include a number of similar patterns, each of these reference patterns produces a high correlation value. This prevents a correct determination of the input pattern 10. To overcome such drawback, the comparison points of the reference patterns $S_1$ to $S_n$ can be weighted, or part of the input pattern 10 can be designated as a reference region (not shown). However, since such weighting or reference region techniques relies on human judgement, these techniques are intuitive, trial-and-error, solutions. Moreover, the technique of using weighting for the comparison points of the reference patterns $S_1$ to $S_n$ have to be expressed in terms of multiple values, and are expressed as a pair of values in the prior art apparatuses 11. This increases the complexity of the calculations and the processing time.

Furthermore, in preparing the reference patterns $S_1$ to $S_n$, it is generally assumed that the input pattern 10 is an ideal pattern. However, in practice the input pattern 10 is prone to positional shifts, fading, and so forth which degrades the pattern recognition rate. Thus, there is a need for a pattern recognition apparatus that is capable of achieving a high pattern recognition rate even when the image quality or precision of the input pattern 10 is not very good. Additionally, there is a need for a pattern recognition apparatus that enables the speed of the pattern recognition to be increased by greatly reducing the number of pattern comparison points (evaluation points) that are used.

SUMMARY OF THE INVENTION

The present invention is directed to pattern recognition method and apparatus that judges an input pattern by comparing the input pattern with a plurality of different registered reference patterns. The pattern recognition apparatus comprises probability calculation means, and entropy calculation means. The probability calculation means calculates a probability of the existence of any one of the plurality of reference patterns for each pixel within a prescribed frame surrounding the plurality of pixels forming each one of the reference patterns. The entropy calculation means is responsive to the probability values obtained from the probability calculation means for calculating information content entropy values which are used as a basis for selecting pixels to be used for comparison with corresponding pixels of the input pattern.

In a first aspect of the above-described pattern recognition apparatus in accordance with the present invention, the entropy calculation means comprises calculating means and selecting means. The calculating means is responsive to the probability values obtained from the probability calculation means for calculating information entrophy values. The selecting means is responsive to the calculated information entropy values for selecting entrophy values above a predetermined value for selecting pixels within the frame of each reference pattern to be used for comparison with corresponding pixels of the input pattern.

In a second aspect of the above described pattern recognition apparatus in accordance with the present invention, the entropy calculation means comprises calculating means, producing means, and selecting means. The calculating means is responsive to the probability values obtained from the probability calculation means for calculating information entropy values. The producing means is responsive to a distribution of the calculated information entropy values within a frame for producing a concentration of a predetermined plurality of centroid pixel points with a predetermined number of adjacent surrounding pixels at certain locations within the frame of each of the reference patterns using a K-mean technique. The selecting means is responsive to the location of the plurality of centroid pixel points and the adjacent surrounding pixels for selecting the pixels within the frame of the reference patterns to be used for comparison with corresponding pixels of the input pattern.

The method of pattern recognition in accordance with the present invention compares an input pattern with a plurality of different registered reference patterns and comprises the following steps. In a first step, a probability of the existence of any one of the plurality of reference patterns is calculated for each pixel within a prescribed frame surrounding the plurality of pixels forming each one of the reference patterns. In a second step, information content entropy values are calculated in responsive to the probability values obtained in the first step for use as a basis for selecting pixels to be used for comparison with corresponding pixels of the input pattern. In a third step, pixels selected in the second step are compared with corresponding pixels in the input pattern for determining which of the plurality of reference patterns provides a closest match with the input pattern.

The invention and its various advantages will be better understood from the following more detailed description taken with the accompanying drawings and claims.

BRIEF DESCRIPTION OF THE DRAWINGS

FIG. 5 shows a frame of the exemplary reference pattern of FIG. 4 including centroids and surrounding pixel regions derived by a K-mean method;

DETAILED DESCRIPTION

Figure 1:
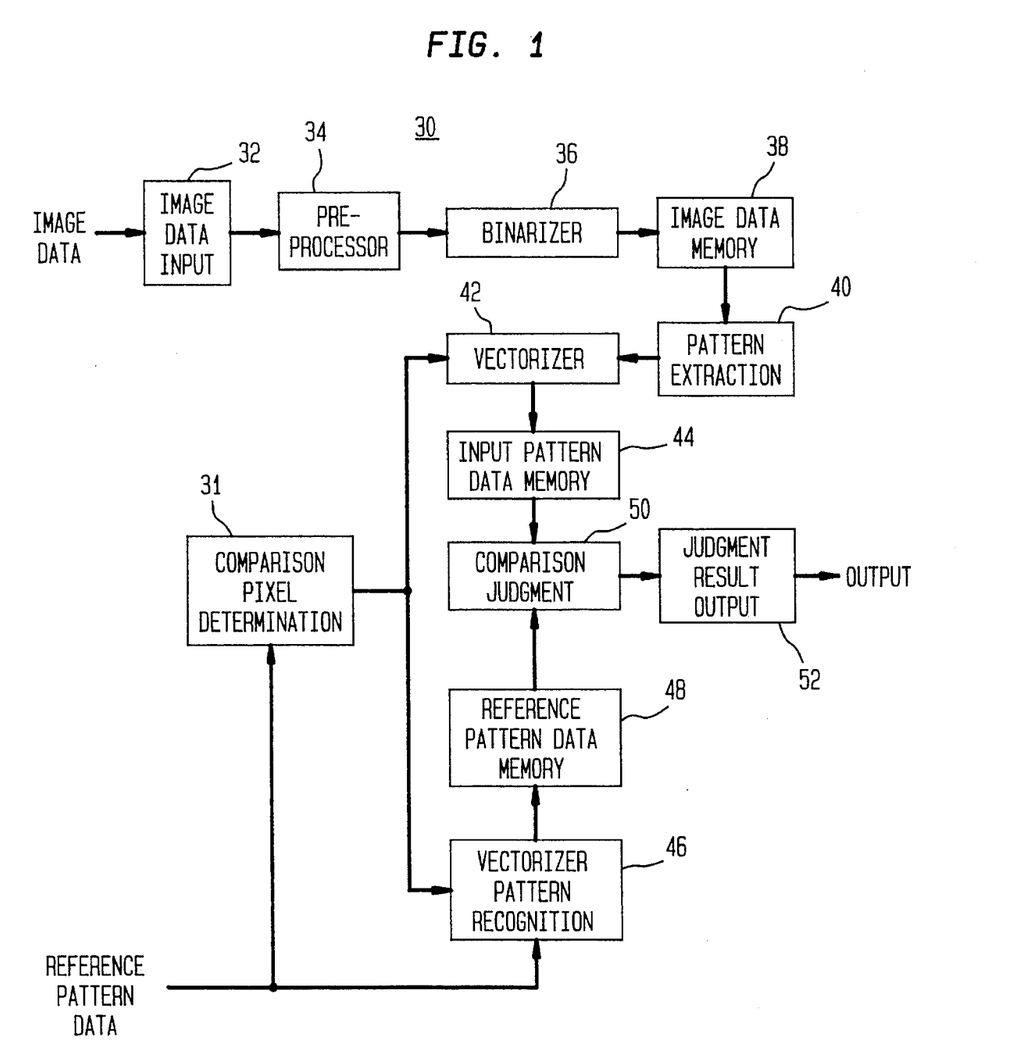
FIG. 1 shows a block diagram of a pattern recognition apparatus in accordance with the present invention.

Referring now to FIG. 1, there is shown a block diagram of a pattern recognition apparatus 30 in accordance with the present invention. The pattern recognition apparatus 30 comprises a comparison pixel determination section 31, an image data input section 32, a preprocessor section 34, a binarizer 36, an image data memory section 38, a pattern extraction section 40, a vectorizer 42, and input pattern data memory 44, a vectorizer pattern recognition section 46, a reference pattern data memory 48, a comparison judgment section 50, and a judgment result output section 52. More particularly, image data is inputted to the image data input section 32. This data is processed by passing the data through the serial connection of the preprocessor section 34, the binarizer 36, the image data memory section 38, the pattern extraction section 40, a first input of the vectorizer 42, the input pattern data memory 44, a first input of the comparison judgment section 50, and the judgment result output section 52. Reference pattern data signals are inputted to both the comparison pixel determination section 31 and to a first input of the vectorizer pattern recognition section 46. An output from the comparison pixel determination section 31 is coupled to a second input of the vectorizer 42 and to a second input of the vectorizer pattern recognition section 46. An output from the vectorizer pattern recognition section 46 is coupled to a second input of the comparison judgment section 50 via the reference pattern data memory 48.

In operation, image data scanned by a CCD or other such image acquisition means is inputted to the preprocessing section 34 via the image data input section 32. The preprocessing section 34 serves to, for example, remove noise components and adjust the orientation of the image. The image data is then binarized by the binarizing section 36, stored temporarily in the image data memory 38, and is then sent to the pattern extraction section 40 which extracts and outputs only the essential input pattern image data, in a prescribed frame.

The input pattern data is then inputted to the first input of the vectorizer 42. The comparison pixel determination section 31 supplies the second input of the vectorizer 42 with information on the positions of the comparison pixels to be used by the comparison judgment section 50. The vectorizer 42 converts the input pattern data to evaluation vectors (based on an Equation (4) which is shown and described hereinafter), and the data of the evaluation vectors are stored in the input pattern data memory 44. Alternatively, although not shown, all of the input pattern data extracted by the pattern extraction section 40 can be stored directly in the input pattern data memory 44 and converted to evaluation vectors by the comparison judgement section 50. However, the preferred arrangement of storing the evaluation vectors from the vectorizer 42 has the advantage of being able to use a memory with a smaller capacity.

The reference pattern data is retrieved from a memory (not shown) and is inputted to the vectorizer pattern recognition section 46. Here too, the comparison pixel determination section 31 supplies the vectorizer pattern recognition section 46 with information on the positions of the comparison pixels to be used by the comparison judgment section 50. The vectorizer pattern recognition section 46 converts the reference pattern data into evaluation vectors (also in accordance with equation (4)), and the evaluation vector data is then stored in a reference pattern data memory 48.

In the comparison judgment section 50, the input pattern data evaluation vectors stored in the input pattern data memory 44 are compared with the evaluation vectors of the reference pattern data stored in the reference pattern data memory 48. The input pattern, as determined from the reference pattern evaluation vectors, that shows the closest match is outputted from the comparison judgment section 50. The judgement result output section 52 then outputs the result to, for example, a visual display unit (not shown).

The pattern recognition apparatus 30 in accordance with the present invention enables pattern recognition to be speeded up over the prior art pattern recognition apparatus 11 of FIG. 9 by greatly reducing the number of pattern comparison points (evaluation points) that are used to identify an image pattern. More particularly, the pattern recognition apparatus 30 utilizes the following principles in accordance with the present invention.

Figure 8A:
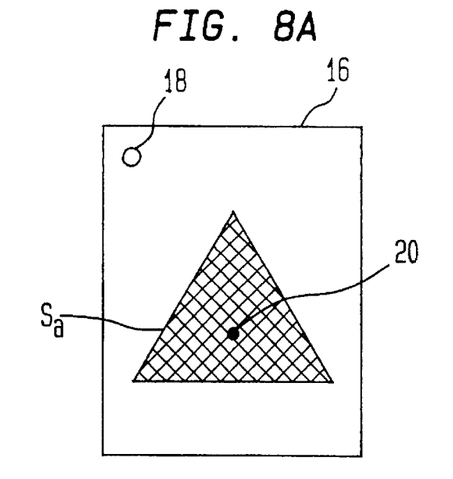
FIGS. 8A and 8B show two exemplary reference patterns $S_a$ and $S_b$.
Figure 8B:
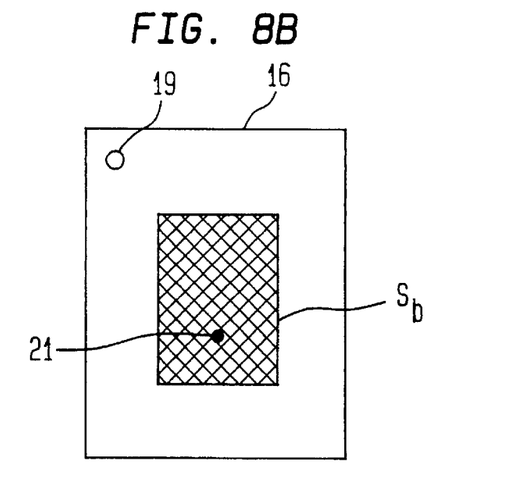
Figure 8C:
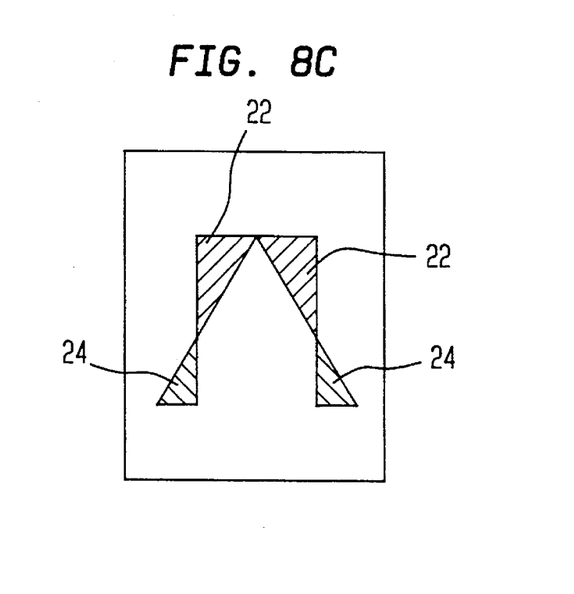
FIG. 8C shows the difference between the two exemplary reference patterns of FIGS. 8A and 8B.

Referring now to FIGS. 8A, 8B, and 8C, FIG. 8A shows a first exemplary reference patterns $S_a$ (shown in a crosshatched triangle) within a prescribed frame 16 comprising a first pixel 18 located outside the reference pattern $S_a$, and a second pixel 20 located inside the reference pattern $S_a$. FIG. 8B shows a second exemplary reference patterns $S_b$ (shown in a cross-hatched rectangle) within the prescribed frame 16 comprising a first pixel 19 located outside the reference pattern $S_b$, and a second pixel 21 located inside the reference pattern $S_b$. FIG. 8C shows information that is of use for recognizing an input pattern [not shown but including one of the patterns of FIGS. 8A or 8B], and shows the hatched regions 22 and 24 of the exemplary reference patterns $S_a$ and $S_b$ that are different when the two reference patterns $S_a$ and $S_b$ are superposed. Normally, a comparison of an input pattern (not shown) with the reference patterns $S_a$ and $S_b$ involves an individual comparison of all of the pixels within the area of the frame 16.

When considering the information content of are outside both of the patterns $S_a$ and $S_b$, are both the corresponding pixels 18 and 19 within the frame 16 in FIGS. 8A and 8B, respectively, the pixels 18 and 19 white in color. Therefore, pixels 18 and 19 do not include information from which a determination of the input pattern can be made from these two reference patterns. Similarly, pixels 20 and 21 of FIGS. 8A and 8B, respectively, are inside the respective reference patterns $S_a$ and $S_b$, are both black in color, and do not include information from which a determination of the input pattern can be made from these two reference patterns. With respect to the two reference patterns $S_a$ and $S_b$ shown in FIGS. 8A and 8B, respectively, the information that is of use in recognizing the input pattern is located in the hatched regions 22 and 24 of FIG. 8C when the two reference patterns $S_a$ and $S_b$ are superposed. For example, an input pattern is recognized as corresponding to the reference pattern $S_b$ of FIG. 8B if the regions of the input pattern corresponding to the regions 22 in FIG. 8C are black. Conversely, the input pattern is recognized as corresponding to the reference pattern $S_2$ of FIG. 8A if the regions of the input pattern corresponding to the regions 24 in FIG. 8C are black.

Based on this assumption, pixel information entropy H is defined by the equation:

$$H = \sum_{i=1}^{N} (-P_i \log_2 P_i) \quad (1)$$

where i is an event number, N is the total number of events, and Pi is the probability of the occurrence of the event i. Thus, to calculate the entropy value H of, for example, the pixel 18 of FIG. 8A, which is white with respect to the reference pattern $S_a$, the probability for pixel 18 being white is 1.0, and the probability for pixel 18 being black is 0. The same result occurs for pixel 19 of FIG. 8B. As such, the entropy H for such pixels are calculated from the following equation:

$$H = -1.0 \log_2 (1.0) - 0 \log (0) = 0 \quad (2)$$

To calculate the entropy H of, for example, pixels 20 and 21 of FIGS. 8A and 8B, respectively, which pixels are both black, equation (2) also produces an entropy value of H=0.

It is to be understood that the probability of a pixel existing within the region 22, or within the region 24, is ½. For such probability, the pixel entropy H is calculated from the following equation:

$$H = -\tfrac{1}{2}\log_2 (\tfrac{1}{2}) - \tfrac{1}{2} \log_2 (\tfrac{1}{2}) = 1 \quad (3)$$

The entropy H values thus calculated for each of the pixels within areas 22 and 24, that form the evaluation points for pattern comparison, represent pixel information content for the purpose of pattern recognition. Using only pixels with high entropy values as evaluation points for pattern recognition permits the elimination of evaluation points that are not needed for comparison purposes (e.g., outside regions 22 and 24).

Other advantages of pattern recognition based on the use of high entropy points are now examined from a different perspective. As in the typical prior art arrangements, here a two-dimensional evaluation vector, R=(X, Y), is introduced. For the evaluation vector R, X stands for the region 22 of FIG. 8C, and it is assumed that X=1 when the region 22 is black and X=0 when the region 22 is white. Similarly, Y stands for the region 24, and it is assumed that Y=1 when the region 24 is black and Y=0 when the region 24 is white.

When examining region 22 and region 24 with respect to an input pattern, the input pattern can be recognized as corresponding to the reference pattern $S_b$ of FIG. 8B when the two-dimensional evaluation vector R=(1, 0). Similarly, the input pattern can be recognized as corresponding to the reference pattern $S_a$ of FIG. 8A when the two-dimensional evaluation vector R=(0, 1). Regarding the direction of the two-dimensional evaluation vectors R, it is readily understood that the above two terms are orthogonal. That is, using high entropy points for the pattern recognition makes it possible to achieve two-dimensional evaluation vectors R with good orthogonality. In other words, it results in a pattern recognition process that uses only the information that is truly useful. In the pattern recognition apparatus 30 of FIG. 1, an entropy value H is calculated for each pixel by the comparison pixel determination section 31. This entropy value is then used as a basis for determining whether or not a predetermined pixel in the frame 16 is to be used as an evaluation point in the pattern recognition operation.

Figure 6:
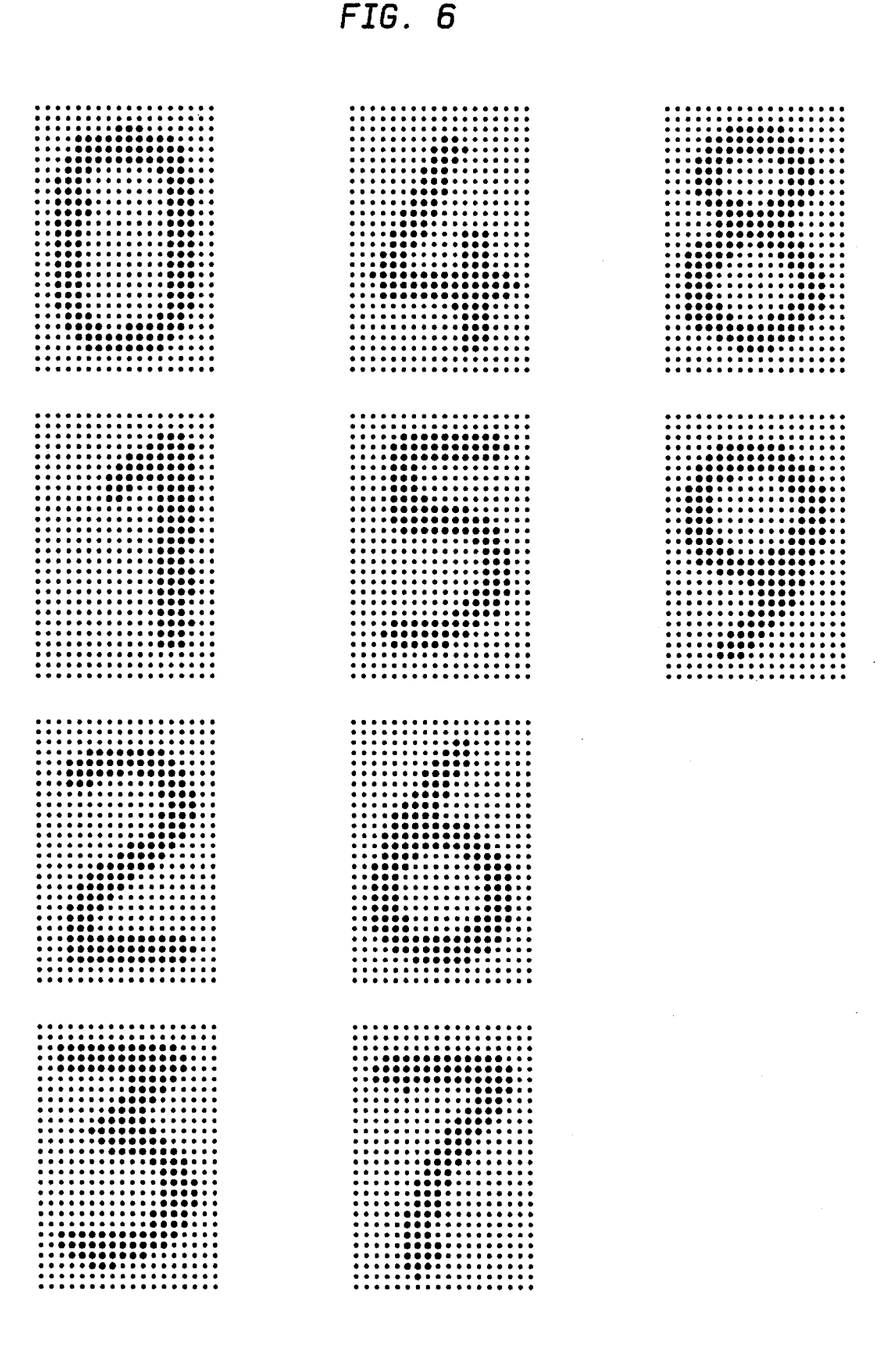
FIG. 6 shows samples of exemplary distortion-free reference patterns recognized by the pattern recognition apparatus in accordance with the present invention.

Referring now to FIG. 6, there is shown exemplary reference patterns for the numerals 0 to 9. It is assumed hereinafter that the pattern recognition apparatus 30 of FIG. 1 is used for recognizing an input pattern comprising one of the numerals 0 to 9 shown in FIG. 6. Input patterns are generally considered to have relatively little distortion, but in practice it has been found that the binarization process described hereinbelow can result in images that are displaced or defaced. When the input patterns are alphanumeric characters, the starting point of characters are often subjected to displacement, rotation and other such positional shifts.

Figure 7:
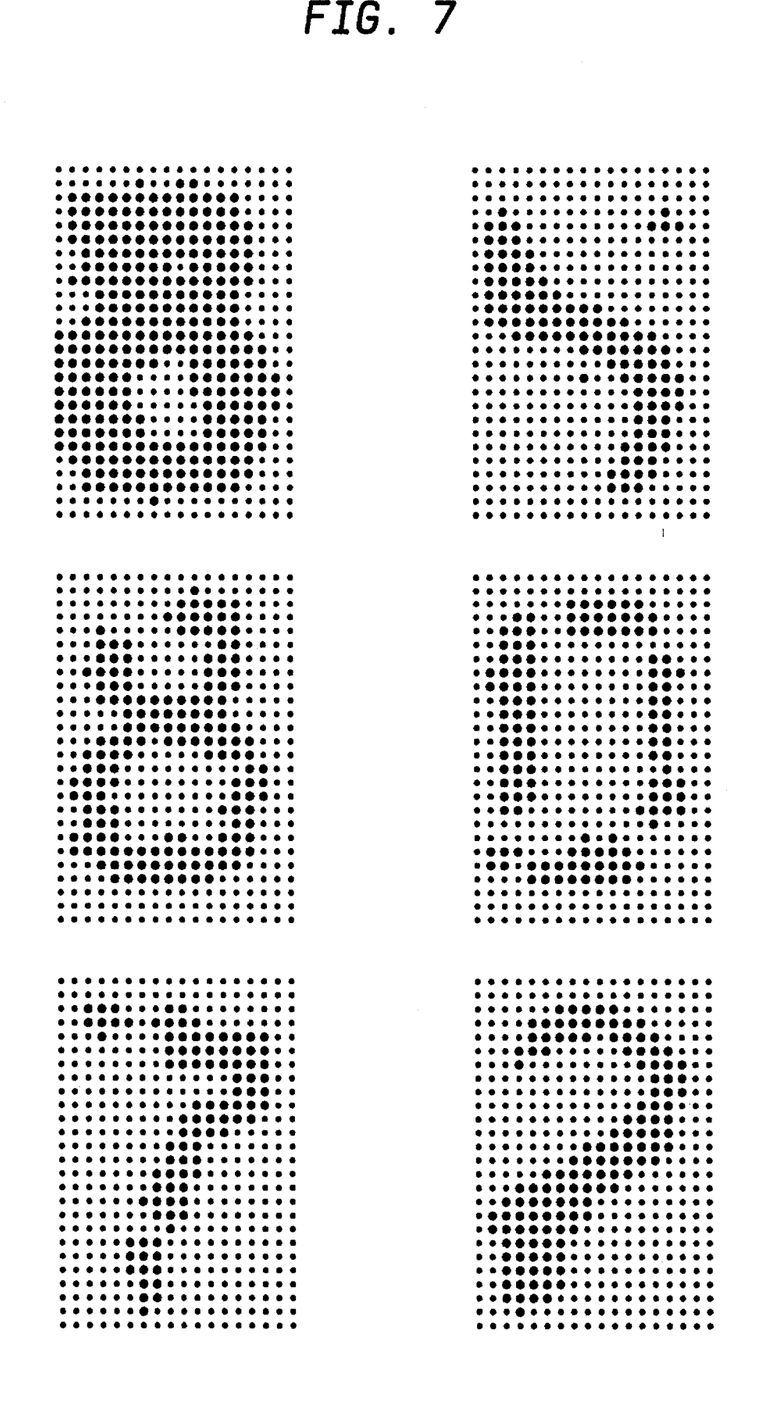
FIG. 7 shows samples of exemplary patterns including distortions which are recognized by the pattern recognition apparatus in accordance with the present invention.

Referring now to FIG. 7, there is shown samples of reference patterns that can be recognized by the pattern recognition apparatus 30 of FIG. 1. More particularly, in accordance with the present invention, not only are reference patterns prepared that are clear and essentially free of distortion as shown in FIG. 6, but versions of the reference patterns 0 to 9 that include slight distortions are also prepared. For exemplary purposes only, it is assumed hereinafter that sixteen variant versions of each of the reference patterns of 0 to 9 shown in FIG. 6 are prepared, or a total of 160 reference patterns. It is through these variant versions of the reference patterns 0 to 9 that image patterns which include displacement, rotation and other such positional shifts are recognized by the pattern recognition apparatus 30 of FIG. 1.

Figure 2:
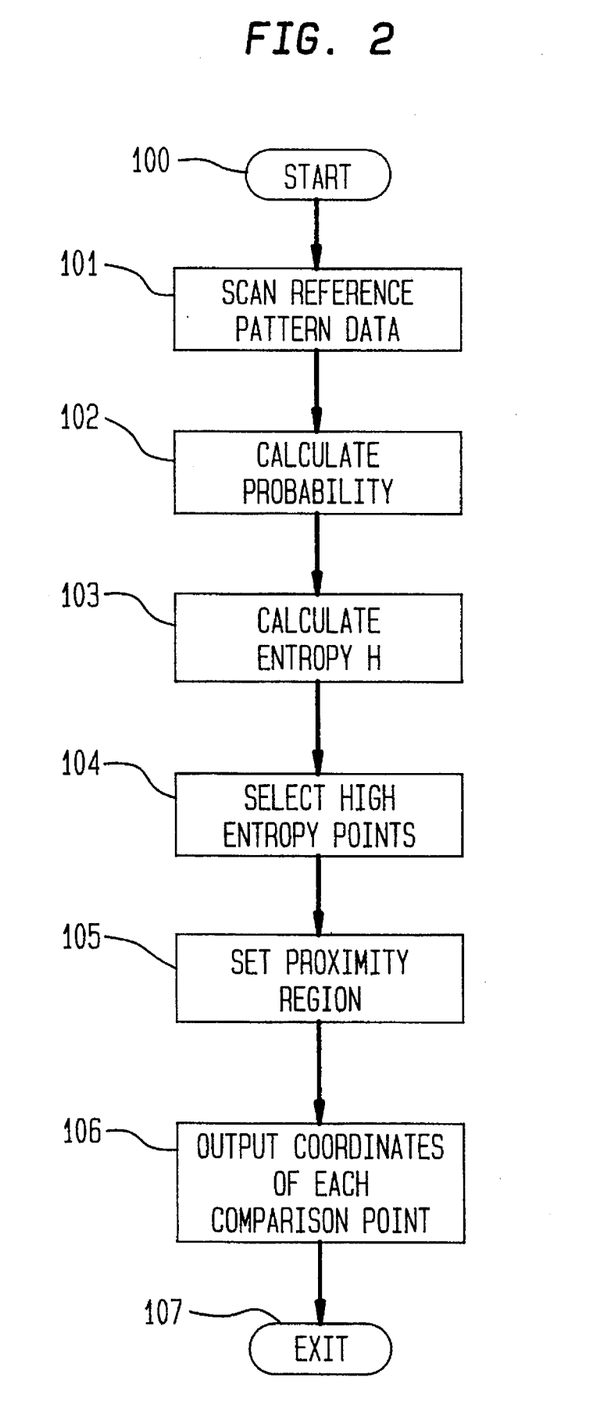
FIG. 2 shows a flowchart of the operation of a comparison pixel determination section of the pattern recognition apparatus of FIG. 1.

Referring now to FIG. 2, there is shown a flowchart of the operation of the comparison pixel determination section 31 in the pattern recognition apparatus 30 of FIG. 1. In a first step designated by block 101 (following a "start" block 100), data relating to the 160 variant reference patterns (discussed hereinabove) is read out of a memory (not shown in FIG. 1) and provided as an input to the comparison pixel determination section 31. In a second step designated by block 102, the probability [$P_i$ of equation (1)] is calculated for each pixel within a frame 16 (of FIG. 6) that contains a reference pattern being black or white. In a third step designated by block 103, the probability of each pixel being black or white, as calculated in block 102, is used to calculate the information content entropy value H, using equation (1). The function of block 103 is better understood from FIG. 4.

Figure 4:
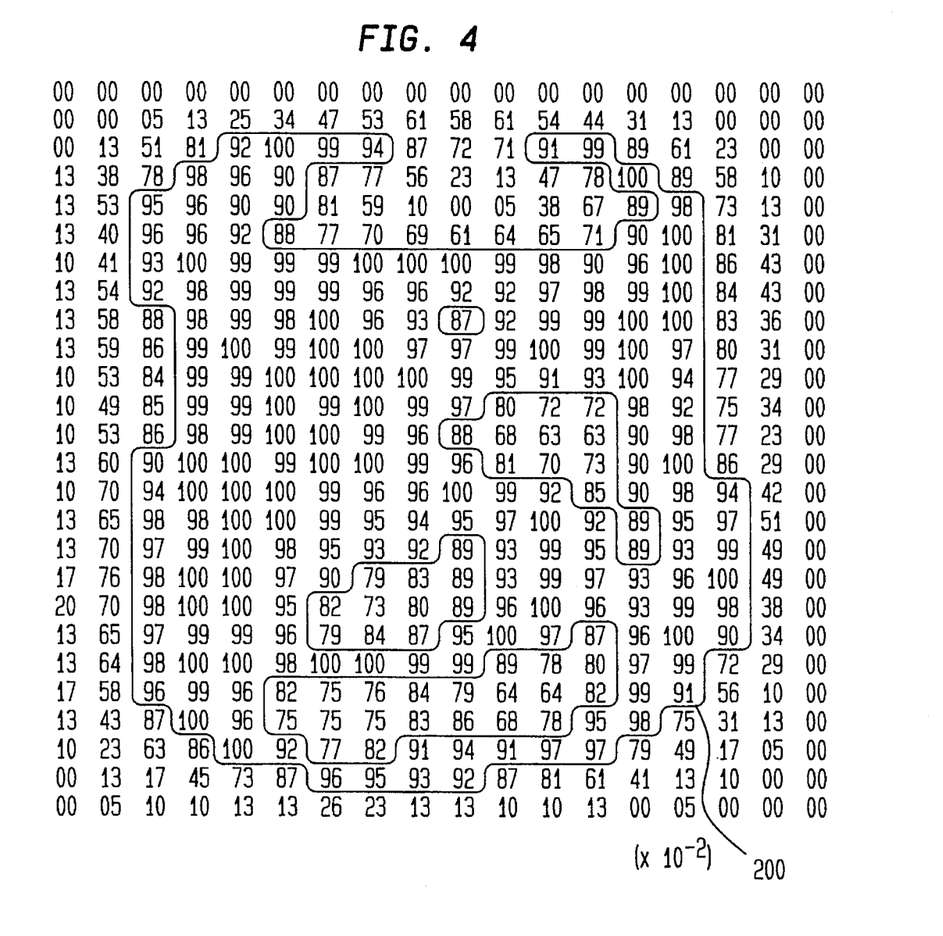
FIG. 4 shows a frame of an exemplary reference pattern including a set of delineated pixels with an entropy value above a certain threshold.

Referring now to FIG. 4, there is shown pixel entropy values H thus obtained for the 160 variant reference patterns. An examination of FIG. 4 shows that pixels with high entropy values are concentrated at or near the center, while the probability of black pixels near the edges is relatively low.

Returning now to FIG. 2, in a fourth step designated by block 104, pixels with high entropy values are extracted from the entropy values H obtained in the third step indicated by block 103. In a fifth step designated by block 105, a proximity region is set as is explained hereinbelow. In a sixth step designated by block 106, the output coordinates of each comparison point is provided before the operation of the comparison pixel determination section 30 is exited via block 107. The output coordinates of the comparison pixels from block 106 are provided as inputs to the vectorizer section 42 and the vectorizer pattern recognition section 46 of FIG. 1.

The fourth step designated by block 104 in FIG. 2 can be done in a number of ways. One way is that used to produce a region 200 of FIG. 4, which is produced by a straight extraction of entropies of 0.9 and above, and designating any pixel with an entropy of 0.9 or more as an evaluation point. From the 468 entrophy values shown in the 18-by-26 entrophy value matrix of FIG. 4, the straight extraction of entropies of 0.9 or above results in the designation of just 207 pixels as evaluation points or pixels. The resulting 207 evaluation points roughly halves the number of comparison pixels used by the prior art method (which uses all 468 pixels) for comparison purposes. This greatly reduces the number of calculations involved.

Another technique involves taking into account the entropy distribution over the whole frame. There is for example the K-mean technique as described, for instance, on page 250 of the book entitled "Pattern Classification and Scene Analysis" by Duda and Hart. In the K-mean technique, the entropy space shown in FIG. 4 consists of twenty-four small regions (not shown), each of the same size, and an entropy centroid (central pixel) of each of these small regions is calculated from the entropy values of the pixels and the distance from the centroid. The frame of 468 pixels is then redivided into twenty-four small regions each consisting of one of the above twenty-four centroids and the closest surrounding pixels. This is readily ascertained by calculating the distance between the twenty-four centroids and each pixel. The centroid of each of those twenty-four regions is then again obtained, and the frame of 468 pixels is again divided into small regions each centering on one of those newly obtained centroids. Repeating this process gradually produces a concentration of centroid points at certain locations.

Referring now to FIG. 5, there is shown a plurality of 24 centroids 202 obtained from the K-mean technique as explained hereinabove. Thus, the derivation of these twenty-four centroids 202 (each shown as a single two or three digit number with a rounded edge rectangle therearound) is not based simply on their having a high entropy value, but instead also takes into account the entropies of the surrounding pixels. However, recognition evaluation processing based only on such centroids can be greatly influenced by, for example, noise elements that cause a loss of pixel data corresponding to a centroid, or by a one-pixel shift extending over an entire input pattern.

In accordance with the present invention, a proximity region 204 measuring 3-by-3 pixels is established for each of the centroids 202, and the sum of the pixels of each of the proximity regions 204 is used as the representative value of the region's centroid. This proximity region is set in the fifth step of FIG. 2 as is shown by block 105.

As is now described, the orthogonality of the two-dimensional evaluation vectors R is utilized for the comparison of an input pattern and the reference patterns. As such, the two-dimensional evaluation vectors R derived from the calculated entropies shown in FIG. 5 have twenty-four elements r, each element r having a value between 0 and 9 that is the sum of the pixels of each proximity region 204. This is expressed by the following equation:

$$R = (r_1, r_2, \ldots, r_{24}) \qquad (4)$$

where r has a value of from 0 to 9. The reason for the 24 small regions when using the K-mean method will now be explained.

Figure 3:
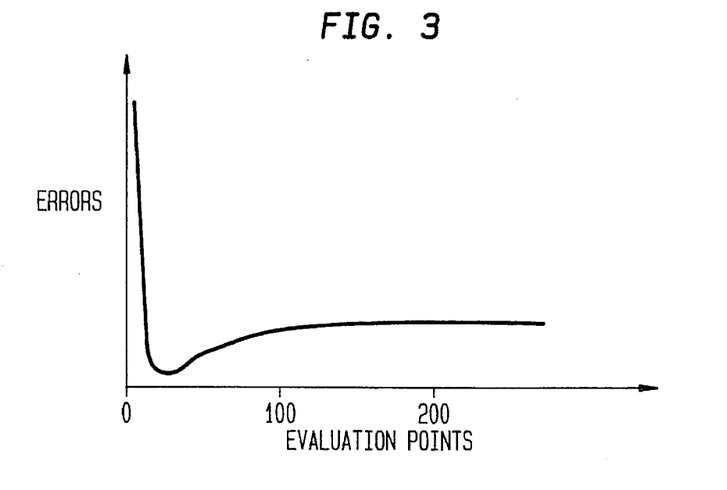
FIG. 3 shows a graph of a relationship between a number of evaluation points and a number of errors.

Referring now to FIG. 3, there is shown a graph of a relationship between a number of evaluation points and a number of errors obtained by experimentation. FIG. 3 shows that under the conditions used in the present invention, errors were fewest when the number of evaluation points is around 30. More evaluation points results in more non-essential information being processed, hence producing a slight increase in the number of errors. The number of evaluation points is set at 24, since it is close to 30. Experiments using 3-by-3 and 5-by-5 proximity regions, indicated a preferred use of the 3-by-3 configuration. A 5-by-5 configuration increased the amount of overlap among adjacent regions. The 5-by-5 configuration lowered the pattern recognition rate. The resultant coordinates of the twenty-four comparison pixels are determined and outputted to the prescribed vectorizer pattern recognition section 46 and vectorizer section 42 (as shown in step 106 of FIG. 2).

A characteristic feature of the present invention is (a) the use of information content entropy values to determine the comparison pixels, and (b) the processing operation of the comparison judgement section 50 which can be adapted to various techniques in conventional use.

It is to be appreciated and understood that the specific embodiments of the invention described hereinabove are merely illustrative of the general principles of the invention. Various modifications may be made by those skilled in the art which are consistent with the principles set forth. For example, the comparison judgment method used by the comparison judgement section 50 may be any one of the various methods in conventional use (i.e., the centroids 202 of the typical variant reference patterns shown in FIG. 5 may be converted to evaluation vectors R). These evaluation vectors are then averaged to produce standard data. Pattern recognition is then performed on the basis of the correlation between this standard data and the input patterns. Alternatively, any suitable neural network that has been developed in recent years can be utilized to obtain the reference pattern evaluation vectors. This knowledge is then stored in the comparison judgement section 50 for use by the pattern recognition process. Still further, it is also possible to use the high orthogonality of the entropy evaluation vectors R, described hereinbefore, by applying orthogonal transforms to the comparison of the input pattern and the reference patterns. This technique involves selecting a plurality of representative reference pattern evaluation vectors to form a correlation matrix, and applying a KL (Karhunen-Loive) transform to the matrix. The resultant KL transform coefficients are then used to produce standard reference pattern data. Using up to three-dimensional KL transform coefficients, it is possible to achieve a recognition rate of over 99.9% in the case of the numeric characters 0 to 9 shown in FIG. 6. Furthermore, while the invention has been described with reference to a two-dimensional image spatial plane, this is not limitative, as entropy values can be applied with respect to characteristic pattern quantities.

What is claimed is:

1. A pattern recognition apparatus for comparing an input pattern with a plurality of different registered reference patterns comprising:

probability calculation circuit means for calculating a probability of the existence of a pixel of any one of the plurality of different registered reference patterns at each pixel within a prescribed frame of M×N pixels separately forming each one of the reference patterns;

entropy calculation circuit means responsive to the probability values obtained from the probability calculation means for calculating pixel information content entropy values for each of the pixels within the prescribed frame, and using said entropy values as a basis for selecting a number of pixel points in the prescribed frame which is less than M times N to be used for comparison with corresponding pixel points of the input pattern, wherein the entropy calculation means comprises means responsive to the probability values obtained from the probability calculation means for calculating information entropy values means responsive to a distribution of the calculated information entropy values within a frame for producing a predetermined plurality of centroid pixel points with a predetermined number of adjacent surrounding pixels at certain locations within the frame of the reference patterns using a K-mean technique and selecting means responsive to the location of the plurality of centroid pixel points and the adjacent surrounding pixels for selecting the pixels within the frame of the reference patterns to be compared with corresponding pixels of the input pattern;

first vectorizing means responsive to data regarding pixels of the input pattern for converting positions of the pixels in the input pattern, corresponding to the pixels selected by the selecting means, into first evaluation vectors;

second vectorizing means responsive to data regarding pixels of each reference pattern for converting positions of the pixels in the plurality of reference patterns, corresponding to the pixels selected by the selecting means, into second evaluation vectors; and comparator circuit means for comparing the first and second evaluation vectors and generating an output signal indicating which of the plurality of reference patterns has a highest probability of being the input pattern.

2. A pattern recognition apparatus for comparing an input pattern with a plurality of different registered reference patterns comprising:

probability calculation circuit means for calculating a probability of the existence of a pixel of any one of the plurality of different registered reference patterns at each pixel within a prescribed frame of M×N pixels separately forming each one of the reference patterns;

entropy calculation circuit means responsive to the probability values obtained from the probability calculation means for calculating pixel information content entropy values for each of the pixels within the prescribed frame, and using said entropy values as a basis for selecting a number of pixel points in the prescribed frame which is less than M times N to be used for comparison with corresponding pixel points of the input pattern, wherein the entropy calculation means comprises means responsive to the probability values obtained from the probability calculation means for calculating information entropy values, and Selecting means responsive to the calculated pixel information entropy values for selecting entropy values above a predetermined value for selecting pixels within the frame of the plurality of different reference patterns to be used for comparison with corresponding pixels of the input pattern;

first vectorizing means responsive to data regarding pixels of the input pattern for converting positions of the pixels in the input pattern, corresponding to the pixels selected by the selecting means, into first evaluation vectors;

second vectorizing means responsive to data regarding pixels of the plurality of reference patterns for converting positions of the pixels in the plurality of reference patterns, corresponding to the pixels selected by the selecting means, into second evaluation vectors; and comparator circuit means for comparing corresponding ones of the first and second evaluation vectors and determining which of the reference patterns provides a highest probability of being the input pattern.

3. A pattern recognition apparatus comprising:

means for receiving an input pattern which is defined with a frame of M×N pixels;

means for receiving a plurality of different reference patterns where each reference pattern is defined within a frame of M×N pixels and at least one of the reference patterns includes a representation of the input pattern;

probability calculation circuit means for calculating a probability of the existence of any one of the plurality of reference patterns at each pixel within the prescribed frame separately forming each one of the reference patterns;

entropy calculation circuit means responsive to the probability values calculated by the probability calculation means for calculating pixel information content entropy values for each of the pixels within the prescribed from of the plurality of reference patterns, and determining from the entropy values for all of the different registered reference patterns which of the calculated pixel information content entropy values provide a basis for selecting a number of pixel points in the prescribed frame which is less than M times N for comparing corresponding pixel points of the input pattern and each of the reference patterns; and comparator circuit means for comparing the selected pixels determined to provide a basis for comparison for each of the reference patterns by the entropy calculation means with corresponding pixels of the input pattern, and generating an output signal indicating which one of the plurality of reference patterns has a highest probability of being the input pattern;

wherein the entropy calculation circuit means comprises means responsive to the probability values obtained from the probability calculation means for calculating pixel information entropy values, means responsive to a distribution of the calculated pixel information entropy values within a frame for producing a predetermined plurality of centroid pixel points with a predetermined number of adjacent surrounding pixels at certain locations within the frame of each of the reference patterns using a K-mean technique, and selecting means responsive to the location of the plurality of centroid pixel points and the adjacent surrounding pixels for selecting the pixels within the frame of the reference patterns to be used by the comparator for comparison with corresponding pixels of the input pattern; and further comprising first vectorizing means responsive to data regarding pixels of the input pattern for converting positions of the pixels in the input pattern, corresponding to the pixels selected by the selecting means, into first evaluation vectors; and second vectorizing means responsive to data regarding pixels of each reference pattern for converting positions of the pixels in the plurality of reference patterns, corresponding to the pixels selected by the selecting means, into second evaluation vectors;

wherein the comparator circuit means compares corresponding ones of the first and second evaluation vectors and determines which of the reference patterns provides the highest probability of being the input pattern.

4. A pattern recognition apparatus comprising:

means for receiving an input pattern which is defined with a frame of M×N pixels;

means for receiving a plurality of different reference patterns where each reference pattern is defined within a frame of M×N pixels and at least one of the reference patterns includes a representation of the input pattern;

probability calculation circuit means for calculating a probability of the existence of any one of the plurality of reference patterns at each pixel within the prescribed frame separately forming each one of the reference patterns;

entropy calculation circuit means responsive to the probability values calculated by the probability calculation means for calculating pixel information content entropy values for each of the pixels within the prescribed from of the plurality of reference patterns, and determining from the entropy values for all of the different registered reference patterns which of the calculated pixel information content entropy values provide a basis for selecting a number of pixel points in the prescribed frame which is less than M times N for comparing corresponding pixel points of the input pattern and each 0f the reference patterns; and comparator circuit means for comparing the selected pixels determined to provide a basis for comparison for each of the reference patterns by the entropy calculation means with corresponding pixels of the input pattern, and generating an output signal indicating which one of the plurality of reference patterns has a highest probability of being the input pattern;

wherein the entropy calculation means comprises means responsive to the probability values obtained from the probability calculation means for calculating pixel information entropy values, and selecting means responsive to the calculated pixel information entropy values for selecting entropy values above a predetermined value for selecting pixels within the frame of the plurality of different reference patterns to be used by the comparator circuit means for comparison with corresponding pixels of the input pattern; and further comprising first vectorizing means responsive to data regarding pixels of the input pattern for converting positions of the pixels in the input pattern, corresponding to the pixels selected by the selecting means, into first evaluation vectors;

second vectorizing means responsive to data regarding pixels of each reference pattern for converting positions of the pixels in the plurality of reference patterns, corresponding to the pixels selected by the selecting means, into second evaluation vectors; and wherein the comparator circuit means compares corresponding ones of the first and second evaluation vectors and determines which of the reference patterns provides the highest probability of being the input pattern.

5. A method of providing pattern recognition in a pattern recognition apparatus that compares an input pattern with a plurality of different registered reference patterns comprising the steps of:

(a) calculating in a probability calculation device a probability of the existence of any one of the plurality of reference patterns at each pixel within a predescribed frame of M×N pixels separately forming each one of the reference patterns;

(b) calculating in a comparison pixel determination device separate information content entropy values for the pixels within the prescribed frame of the reference patterns in response to the probability values obtained in step (a) for use as a basis for selecting a number of pixels in the prescribed frame of the reference patterns which is less than M times N to be used for comparison with corresponding pixels of the input pattern;

wherein step (b), performed in the comparison pixel determination device, comprises the substeps of: (b1) calculating pixel information entropy values from the probability values obtained in step (a); and (b2) selecting pixel information entropy values from step (b1) which are above a predetermined value for selecting pixels within the frame of the plurality of reference patterns to be used for comparison with corresponding pixels of the input pattern;

(c) converting positions of the pixels in the input pattern corresponding to the pixels selected in step (b) into first evaluation vectors;

(d) converting positions of the pixels in the plurality of reference patterns corresponding to the pixels selected in step (b) into second evaluation vectors; and (e) comparing corresponding ones of the first and second evaluation vectors in a comparator device and determining which of the reference patterns provides the highest probability of being input pattern.

6. A method of providing pattern recognition in a pattern recognition apparatus that compares an input pattern with a plurality of different registered reference patterns comprising the steps of:

(a) calculating in a probability calculation device a probability of the existence of any one of the plurality of reference patterns at each pixel within a predescribed frame of M×N pixels separately forming each one of the reference patterns;

(b) calculating in a comparison pixel determination device separate information content entropy values for the pixels within the prescribed frame of the reference patterns in response to the probability values obtained in step (a) for use as a basis for selecting a number of pixels in the prescribed frame of the reference patterns which is less than M times N to be used for comparison with corresponding pixels of the input pattern;

wherein step (b), performed in the comparison pixel determination device, comprises the substeps of: (b1) calculating pixel information entropy values from the probability values obtained from step (a); (b2) producing a predetermined plurality of centroid pixels with a predetermined number of adjacent surrounding pixels at certain locations within the frame of the plurality of reference patterns using the frame of each of the reference patterns using a K-mean technique from distribution of the calculated pixel information entropy values within a frame obtained from step (b1); and (b3) selecting the pixels within the frame of the reference patterns to be used for comparison with corresponding pixels of the input pattern dependent on the location of the plurality of centroid pixels and the adjacent surrounding pixels obtained in step (b2);

(c) converting positions of the pixels in the input pattern corresponding to the pixels selected in step (b3) into first evaluation vectors;

(d) converting positions of the pixels in the plurality of reference patterns corresponding to the pixels selected in step (b3) into second evaluation vectors; and (e) comparing corresponding ones of the first and second evaluation vectors in a comparator device and determining which of the reference patterns provides the highest probability of being input pattern.

* * * * *